(12) United States Patent
Itkin et al.

(10) Patent No.: US 7,853,290 B2
(45) Date of Patent: Dec. 14, 2010

(54) TRANSMITTER ARRANGEMENT

(75) Inventors: Grigory Itkin, München (DE); Andrei Grebennikov, München (DE)

(73) Assignee: Infineon Technologies AG, Neubiberg (DE)

(*) Notice: Subject to any disclaimer, the term of this patent is extended or adjusted under 35 U.S.C. 154(b) by 641 days.

(21) Appl. No.: 11/927,053

(22) Filed: Oct. 29, 2007

(65) Prior Publication Data

US 2009/0111401 A1 Apr. 30, 2009

(51) Int. Cl.
*H04M 1/00* (2006.01)
*H04B 1/38* (2006.01)

(52) U.S. Cl. .............. 455/552.1; 455/550.1; 455/73

(58) Field of Classification Search ............. 455/552.1, 455/550.1, 73, 432.1, 432.2, 88, 127.3, 341
See application file for complete search history.

(56) References Cited

U.S. PATENT DOCUMENTS

| | | | |
|---|---|---|---|
| 4,598,252 A | 7/1986 | Andricos | |
| 5,541,554 A * | 7/1996 | Stengel et al. | 330/51 |
| 5,774,017 A * | 6/1998 | Adar | 330/51 |
| 5,987,304 A | 11/1999 | Latt | |
| 6,304,748 B1 * | 10/2001 | Li et al. | 455/113 |
| 6,389,269 B1 * | 5/2002 | Nanni et al. | 455/93 |
| 7,058,380 B2 | 6/2006 | Sato | |
| 7,127,216 B2 * | 10/2006 | Frank et al. | 455/83 |
| 7,664,475 B2 * | 2/2010 | Ichihara | 455/168.1 |
| 2007/0026824 A1 | 2/2007 | Ono et al. | |

FOREIGN PATENT DOCUMENTS

DE   10 2004 001 094 A1   8/2005

* cited by examiner

*Primary Examiner*—Sonny Trinh
(74) *Attorney, Agent, or Firm*—Eschweiler & Associates, LLC (57) ABSTRACT

A transmitter arrangement includes a first amplifier arrangement and a second amplifier arrangement. The first amplifier arrangement includes a first amplification path and a second amplification path. The first amplification path is adapted to amplify signals comprising a data content according to a first communication standard. The second amplification path is adapted to amplify signals comprising a data content according to a second communication standard. The second amplifier arrangement further includes a first and second amplification path sharing at least one common amplifier stage that is adapted to amplify signals having a data content according at least to the second communication standard.

25 Claims, 5 Drawing Sheets

TRANSMITTER ARRANGEMENT

TECHNICAL FIELD

The present invention relates to a transmitter arrangement, particularly to a multi-band multi-mode transmitter arrangement.

BACKGROUND

Modern wireless telecommunication devices sometimes require the simultaneous transmission of signals corresponding to different wireless communication standards. Those wireless communications standards require the transmission of signals with a constant or non-constant envelope depending on the modulation type used for the standard. As a consequence, the signals according to different communication standards often require separate transmission paths to satisfy either high efficiency at saturated output power for signals with constant envelope or high linearity for signals with non-constant envelope.

For example, signals with constant envelope may comprise data content according to the GSM850/900 or the DCS1800/PCS1900 communication standard. Modulation types resulting in signals with a non-constant envelope are used by the communication standards according to the WCDMA LB, WCDMA MB or WCDMA HB standard. GSM950/900 is an abbreviation for the "General System for Mobil Communication", while the numbers refer to the center frequency in MHz of the used channel. PCS1900 is the "Personal Communication Service" at a frequency of 1900 MHz used in North America. The Digital Cellular System (DCS) is based on the PCS standard and used outside North America. The communication standards GSM/EDGE, PCS and DCS are part of the second or 2.5 generation of cellular communication networks, also called 2G and 2.5G, respectively. WCDMA stands for "Wideband Code Division Multiple Access" and is a type of the third generation of cellular communication networks and standards (3G).

Due to external, often unknown parameters, for example the distance between a base station and a mobile station, the power amplifiers of the transmitter paths have to deliver a wide range of different output powers. The different communication standards themselves specify different maximum output powers which the power amplifiers in the transmitter paths have to deliver. Further, there is a trade-off between efficiency in high-power applications and linearity of the used amplifiers. Normally, a higher linearity of the amplifier will result in a lower maximum output power and vice versa. Furthermore, the linearity at low output power may differ from the linearity at high output power. Therefore, wireless transmitter architecture often includes a plurality of different power amplifiers in different transmitter paths for each of the above-mentioned standards. Despite the excessive size and costs of such arrangements, talk and battery time is also of some importance.

As a result, there is a desire to further improve already existing arrangements to reduce size and costs.

BRIEF DESCRIPTION OF THE DRAWINGS

The invention is explained in detail below using exemplary embodiments with reference to the drawings in which.

DETAILED DESCRIPTION OF THE INVENTION

In the following description, further aspects and embodiments of the present invention are disclosed. In addition, reference is made to the accompanying drawings which form a part hereof, and in which is shown by way of illustration in which the invention may be practiced. The embodiments of the drawings present a discussion in order to provide a better understanding of one or more aspects of the present invention. The disclosure is not intended to limit the feature or key elements of the invention to a specific embodiment. Rather, the different elements, aspects, and features disclosed in the embodiments can be combined in different ways by a person skilled in the art to achieve one or more advantages of the present invention. It is to be understood that other embodiments may be utilized and structural or logical changes may be made without departing from the scope of the invention. The elements of the drawings are not necessarily to scale relative to each other. For illustration purposes some frequency ranges and communication standards are specified. The ranges as well as the communication standards referred to are not restricted to the embodiment disclosed herein. Other frequency and power ranges or communication standards can also be used to achieve the different aspect of the present invention. Like reference numerals designate corresponding similar parts.

According to one embodiment the proposed solution of a highly efficient power amplifier architecture having significantly reduced size and high efficiency at different output power levels comprises two transmitter paths. A first transmitter path is used for a transmission signal having a center frequency within a first frequency range while the second transmitter path is used for a transmission signal having a center frequency within a second frequency range. The first transmitter path may comprise an amplifier arrangement. Said amplifier arrangement may comprise a first amplification path with a first amplification gain and a second amplification path with a second amplification gain. The second transmitter path may comprise an amplifier arrangement, said amplifier arrangement having a first and a second amplification path wherein the first and second amplification paths comprise at least one common shared amplifier stage.

In a further aspect, the first and second amplification paths of the amplifier arrangement in the first transmitter path may also comprise a common shared amplifier stage.

The common amplifier stages reduce the total amount of different power amplifiers in the first and second transmitter paths. Moreover, the amplifier arrangement including the amplification paths are arranged with respect to the signals to be transmitted. More particularly, transmission signals having a center frequency within the first frequency range can be transmitted by the first transmitter path and therefore amplified by the amplifier arrangement within the first transmitter path. In other words, the first transmitter path is used when signals within the first frequency range are to be transmitted regardless of the data content or the used telecommunication standard. Depending on the maximum output power of the signal to be transmitted, the signal is amplified in the first or the second amplification path.

The second transmitter path may be used if the signal to be transmitted comprises a center frequency within the second frequency range. The different amplification paths of the amplifier arrangement in the second transmitter path are chosen in correspondence to the center frequency of the signal to be transmitted. Still, common amplifier stages in the first and second transmitter paths reduce the total number of required power amplifiers.

In a further embodiment, the transmitter arrangement may also comprise an adjustable power combiner with a signal output. The signal output of the first amplification path of the second transmitter path and a signal output, of the second amplification path of the second transmitter path is coupled to a power combiner. The power combiner combines a signal amplified in the first and second amplification path of the second transmitter path and provides the combined signal at its signal output. By combining both signals, a higher maximum output power can be achieved.

In a further embodiment, the signal output of the power combiner can be coupled to a harmonic filter device.

In another embodiment, the transmitter arrangement may comprise a first and second duplexer unit. A first switch is arranged between a signal output of the first amplification path of the second transmitter path and the first duplexer unit. A second switch is arranged between a signal output of the second amplification path of the second transmitter path and the second duplexer unit. With the switches at the output of the first and second amplification paths, the duplexer unit coupled thereto can be connected or disconnected to the outputs of the amplification paths. The switches allow redirecting any signal amplified in the first and second amplification paths of the second transmitter path to the power combiner for signal combination. In an embodiment, the first and second switches each comprise a diode element which can be adjusted by a DC-bias-signal. In one embodiment, a diode element is of particular advantage when amplifying signals to a high maximum output power. The first and second switches may also comprise a field-effect transistor.

In yet another embodiment, the transmitter arrangement may comprise a first signal input and a second signal input. A first amplifier arrangement is connected to the first signal input, the first amplifier arrangement having a first amplification path and a second amplification path. The first amplification path is adapted to amplify signals comprising a data content according to at least a first communication standard. The second amplification path of the first amplifier arrangement is adapted to amplify a signal comprising a data content according to at least one second communication standard. The transmitter arrangement may also comprise a second amplifier arrangement connected to the second signal input. The second amplifier arrangement comprises a first and second amplification path sharing at least one common amplifier stage. The first and second amplification paths are adapted to amplify signals comprising a data content according to the second communication standard.

In yet another embodiment a power combiner is disposed and coupled to the output terminals of the first and second amplification path of the second amplifier arrangement. The power combiner can be selectively activated, thereby forming a third amplification path when activated signals of both amplification paths are combined by the power combiner. In an embodiment such signal may comprises data content to a third communication standard.

Figure 1:
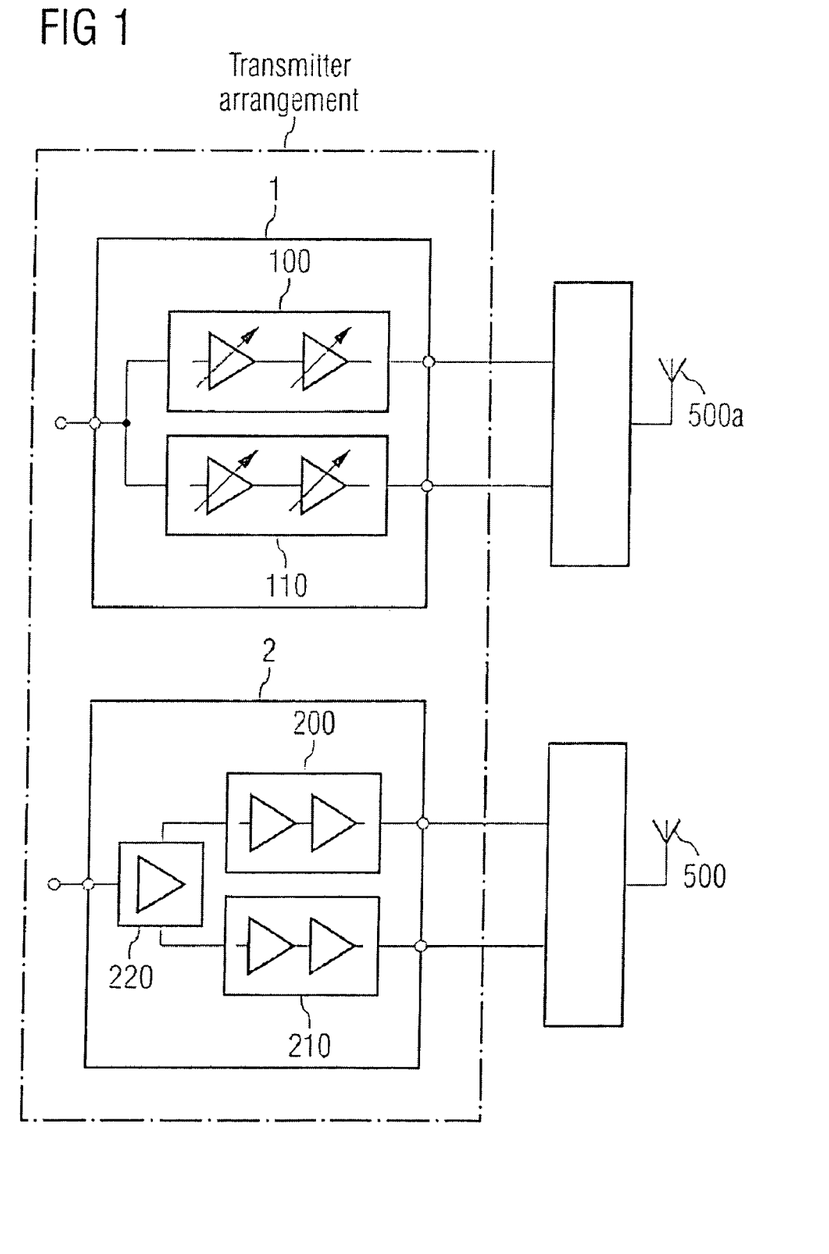
FIG. 1 shows an illustration about some aspects of a transmitter arrangement according to the invention.

FIG. 1 shows an illustration of some aspects of the proposed transmitter arrangement according to one embodiment of the invention. The transmitter arrangement comprises a first amplifier arrangement 1 and a second amplifier arrangement 2. The first amplifier arrangement 1 is adapted to amplify signals having a center frequency within a first frequency range, while the second amplifier arrangement 2 is adapted to amplify signals having a center frequency within at least a second frequency range. Each of the amplifier arrangements 1 and 2 comprise a first and a second amplification path. The first amplifier arrangement 1 comprises a first amplification path 100 and a second amplification path 110. In one embodiment, the total gain of the first and second amplification paths 100 and 110 is adjustable due to the use of adjustable amplifier stages in the respective paths 100, 110. Further, in one embodiment the first amplification path 100 may be optimized to amplify signals according to a first communication standard while the second amplification path 110 can be optimized for amplification of signal with data content according to a second communication standard.

The second amplifier arrangement 2 also comprises a first amplification path 200 and a second amplification path 210. In one embodiment, the first and second amplification path 200, 210 may each comprise one or more amplifier stages while they share also a common amplifier stage 115. In one embodiment, the paths 200 and 210 are optimized to amplify signals having a center frequency within at least the second frequency range and having a data content according at least to the second communication standard. In one embodiment, the shared amplifier stage 220 by both amplification paths can comprise a fixed amplification gain, while further stages in the amplification paths 200, 210 may comprise an adjustable gain.

The output terminals of the respective first and second amplification paths 100, 110, 200 and 210 of the first amplifier arrangement 1 and the second amplifier arrangement 2 is coupled to a first antenna 500a and 500, respectively.

Figure 2:
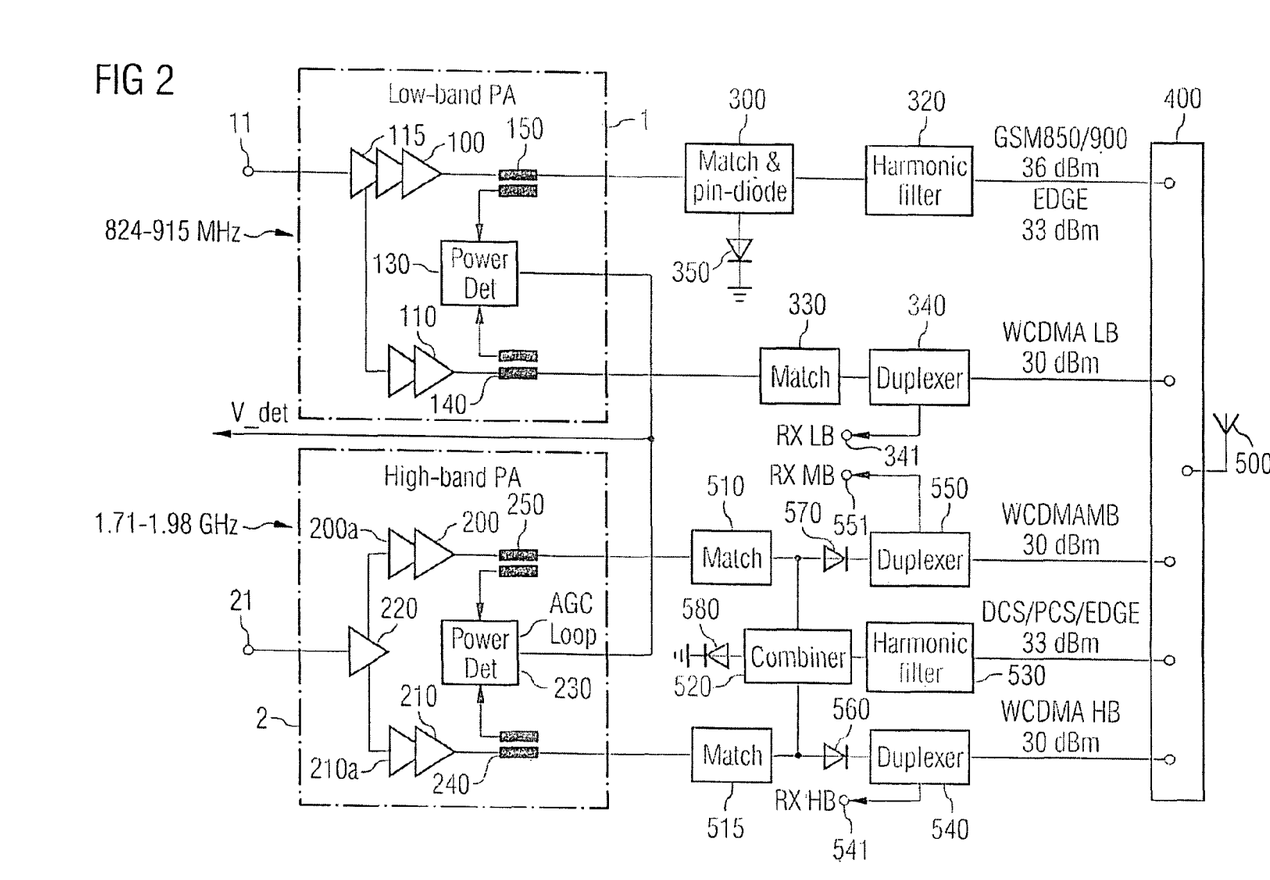
FIG. 2 shows a first exemplary embodiment of a transmitter arrangement.

FIG. 2 shows a more detailed embodiment according to different aspects mentioned above. The transmitter arrangement comprises a first amplifier arrangement 1 and second amplifier arrangement 2. The transmitter as well as the amplifier arrangements can be realized as integrated circuit devices in a semiconductor substrate, according to one embodiment. The amplifier arrangements 1 and 2 can also comprise discrete elements, for example a discrete amplifier stage, a filter, or a directional coupler. Combinations of an integrated circuit and a discrete element are also possible, and such alternatives are contemplated as falling within the scope of the invention.

The first amplifier arrangement 1, also called Low-band PA is connected to a first signal input 11. The first amplifier arrangement 1 comprises a first amplification path 100 and a second amplification path 110. In one embodiment, the first and second amplification paths share one or more common amplifier stages 115, whose input is connected to the signal input 11. Further amplifier stages in each amplification path are connected to the one or more common amplifier stage 115. The different amplification paths 100 and 110 within the first amplifier arrangement 1 are adapted to amplify signals having a center frequency within the range of 824 to 915 MHz. Within this frequency range, signals, with data content for example according to the GSM, EDGE, and WCDMA/UMTS standards can be provided.

More particularly, the GSM mobile communication standard defines a center frequency for signals to be transmitted at 850 and 900 MHz, respectively. The mobile communication standard WCDMA/UMTS (Wideband CDMA, Universal Mobile Telecommunication System) specifies a so-called "Low Band" (LB) for signals to be transmitted. The Low Band comprises different channels, each of those channels having 5 MHz channel width. The frequency range of the "Low Band" according to the communication standard WCDMA is between 824 MHz to 849 MHz according to the 3GPP TS 25.101 V6.4.0 specification, which is incorporated herein by reference. Consequently, the amplification paths as well as the different amplifier stages in the first transmission path are adapted to amplify signals within the range of 824 to 915 MHz.

In one embodiment, each amplifier stage of both amplification paths 100, 110 may comprise one or more amplifiers having a switchable or selectable gain or a fixed gain, depending on the signals to be transmitted. For example, the amplification path 100 comprises some amplifiers with a selectable amplification gain and further amplifiers with fixed amplification gain. The gain of those amplifiers is selected by biasing the amplifiers accordingly. The amplification path 110 also comprises a plurality of amplifiers with a selectable gain representing the different amplifier stages in amplification path 110. However, due to higher requirements regarding linearity, the amplifier stages of path 110 differ from the amplifier stages of path 100.

The output terminals of the amplification paths 100, 110 are coupled to a coupling element 150 and 140, respectively. The coupling elements are connected to a power detector 130 for determining the output power of the first and second amplification paths 100, 110. Concise knowledge of output power or knowledge of a voltage standing wave ratio (VSWR) is required to extend battery and talk time duration. Further, modern communication standards like WCDMA/UMTS demand accurate control of the output power.

The first amplification path 100 is further connected to a matching network 300, comprising a PIN-diode 350 in one embodiment. The matching network 300 is connected to a filter 320 for filtering one or a plurality of harmonic portions of the amplified signal. The second amplification path 110 is coupled to a matching network 330 and to a duplexer 340.

The first amplification path 100 is used for amplification of signals with data content according to the GSM and EDGE standard. The second amplification path 110 amplifies signals according to the WCDMA communication standard in the "Low Band" frequency range (WCDMA LB). The communication standards shown herein specify different maximum output powers. These power levels are given with respect to output insertion losses and can therefore vary depending on the actual losses. While the GSM and EDGE standard require a maximum of 36 dBm and 33 dBm, respectively, the WCDMA LB standard demands a maximum output power of roughly 30 dBm. For this reason the amplification path 100 comprises amplifier stages and amplifiers having a higher amplification gain compared to the second amplification path 110.

While the amplification paths 100 and 110 share a common amplifier stage 115, the first amplification path 100 comprises further high power stages resulting in a total output power of at least 36 dBm. Due to the fact that the GSM mobile communication standard uses a modulation with constant signal envelope, the amplifiers in the amplifier stages of path 100 do not require a high linearity at such high output powers. On the other hand, signals according to the WCDMA standards are using a non-constant envelope, for which amplifiers with high linearity even at high output power are needed.

In one embodiment, to maximize the efficiency for the communication standard EDGE in the low frequency band between 824 MHz and 915 MHz, the PIN-diode 350 of the matching network 300 coupled to the output of the first amplification path 100 can be selectively turned on. The PIN-diode 350 reduces saturated output power to 33 dBm when biased by proper changing of the load impedance between the matching network 300 and the amplification path 100 without lowering the efficiency. An additional shunt or series capacitor or inductor, for example a transmission line, can be connected to the output matching circuit 300 when the PIN-diode 350 is switched on.

The output terminal of the second amplification path 110 is coupled to a matching network 330 and to a duplexer 340. The second amplification path 110 amplifies signals with data content according to the WCDMA standard with a maximum output power up to 30 dBm. The duplexer 340 is also used to provide signals received via an antenna 500 at the terminal 341, which is connected to a receiver arrangement for signals in the "Low Band" frequency range. As a result, the first amplifier arrangement 1 with amplification paths 100 and 110 and the different matching networks 300, 330 as well as the filter 320 or the duplexer 340 connected thereto is able to transmit signals according to at least three different communication standards with different maximum output power.

The second amplifier arrangement 2 comprises a common amplifier stage 220. The common amplifier stage 220 is shared by a first amplification path 200 and a second amplification path 210 of the second amplifier arrangement 2. The first and the second amplification paths 200, 210 of the amplifier arrangement 2 comprise a plurality of amplifier stages 200a, 210a. The amplification gain of the amplifier stages 200a in amplification path 200 is similar to the gain of the amplifier stages 210a in the amplification path 210. As a consequence, both paths provide a total output power of about 30 dBm for the WCDMA Middle Band frequency range (WCDMA MB) as well as for the WCMDA High Band frequency range (WCDMA HB). For determining and controlling the output power of the second amplifier arrangement 2, a power detector 230 is provided. The power detector 230 is coupled to a first bidirectional coupler 250 arranged between a first matching network 510 and the output of the first amplification path 200. A second bidirectional coupler 240 is arranged between a second matching network 515 and the output of the second amplification path 210. Similar to the power detector 130 in the first arrangement 1, the power detector 230 is part of an automatic gain control loop and provides a signal V_det representing the output power of the respective amplification path.

In addition to the two frequency ranges for the WCMDA MB and WCDMA HB communication standards, the communication standards DCS/PCS and EDGE are also using the frequency range of 1.71 GHz to 1.98 GHz. Consequently, the second amplifier arrangement 2 can be used for amplifying signals according to the DCS/PCS and EDGE standard as well. Furthermore, the DCS/PCS and the EDGE communication standard require a maximum output power of 33 dBm. This maximum output power can be achieved by combining amplified signals of the first amplification path 200 and the second amplification path 210 while at the same time separating the duplexer 540 and 550 coupled to the both amplification paths. For this purpose, switches 550 and 570 are arranged between the matching networks 510 and 515 and the respective duplexer 540 and 550. In addition, a power combiner 520 is coupled to the output terminals of the matching networks 510 and 515, respectively. The combiner 520 can comprise lumped or transmission line elements. If necessary, a special matching unit can be used to improve the matching to a standard 50Ω load. The output terminal of the power combiner 520 is connected to a low pass filter 530 for filtering one or a plurality of harmonic portions of the combined signal. The power combiner also comprises a PIN-diode 580 for selectively activating or deactivating the power combiner 520.

If the switches are closed, the amplified signals from the respective amplification paths are provided at the input of the respective duplexer 540 or 550. If the switches are opened, the duplexers are separated and any amplified signal provided by the amplification paths 200 and 210 of the second amplifier arrangement 2 is combined in power combiner 520 and filtered by the filter 530.

In this embodiment the switches 560 and 570 are realized by PIN-diodes. When the PIN-diodes are turned off by applying a proper DC-Bias voltage, any signal from the two amplification paths 200, 210 is applied to the power combiner 520. However, when the PIN-diodes 560, 570 are turned on by a DC-Bias Voltage while at the same time the PIN-diode 580 is switched off by proper biasing, the DCS1800/PCS1900 path including the harmonic filter 530 becomes isolated and the combiner can be turned off. The WCDMA MB path as well as the WCDMA HB path is switched on and the separate amplification paths 200, 210 can be used for either WCDMA MB or WCDMA HB signals. Each of the amplification paths can be designed using balanced or dual path architecture to achieve high efficiency at low power output levels.

The output terminals of each amplifier arrangement 1, 2 including the additional signal path with the power combiner 520 are connected to a multiplexer unit 400. The multiplexer 400 is connected to an antenna 500 for transmitting and receiving signals. If a signal is received via the antenna 500, it is forwarded to one of the duplexer units 240, 540 or 550, respectively, depending on the received signal center frequency. Each duplexer 240, 540 and 550 separates the respective transmitter path connected to a first input terminal from the receiver path. If a signal is received via the antenna 500, the duplexer applies the received signal to the respective terminals 341, 541, or 551 for further processing.

Figure 3:
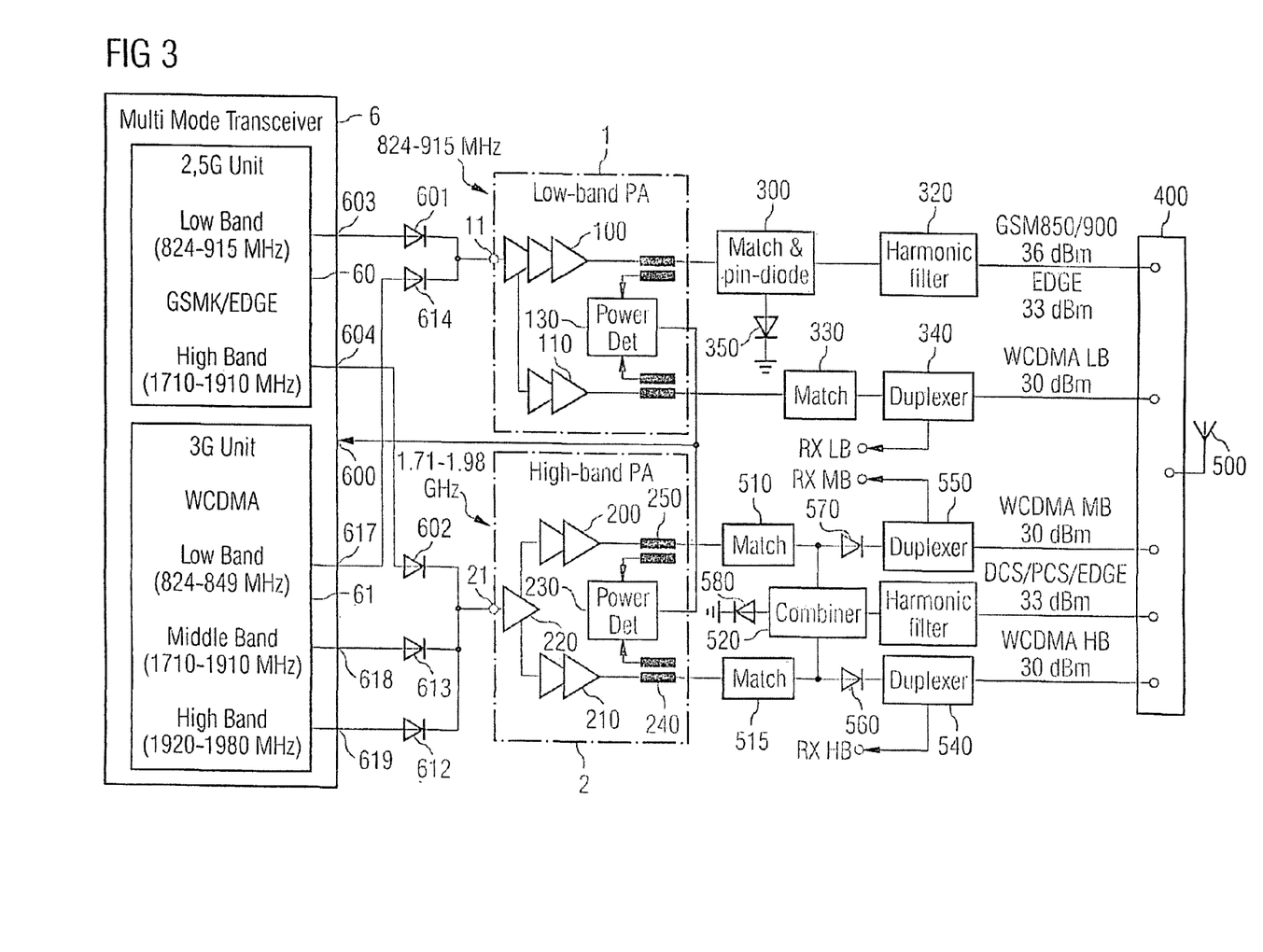
FIG. 3 shows a second exemplary embodiment of a transmitter arrangement including a baseband circuit.

FIG. 3 shows a further embodiment of the transmitter arrangement. The signal inputs 11 and 21 of each of the amplifier arrangement 1 and 2 are coupled to a multi-mode transceiver 6 generating baseband and RF signals. More particularly, the multi-mode transceiver 6 comprises a first arrangement 60 as well as a second arrangement 61.

The first arrangement 60 provides signals with data content according to the 2.5 generation standards. The term "2.5 Generation" is an abbreviation for a plurality of communication standards. Those standards include the GSM/EDGE communication standard for the "Low Band" between 824 MHz and 915 MHz and the "High Band" between 1710 MHz and 1910 MHz. The first arrangement 60 generates digital modulated signals according to at least one of those standards. The digital signals are up-converted to an analog RF signal at the desired frequency band and provided at one of its output terminals 603, 604.

The second arrangement 61 provides signals according to the third generation standards (3G). An example for a third generation mobile standard is the Wideband CDMA standard, also called UMTS telecommunication standard. Signals with data content according to the WCDMA standard are transmitted within three different frequency bands as shown herein. The low frequency band ranges from 824 MHz to 859 MHz. The middle and high frequency band range from 1710 MHz to 1910 MHz and from 1920 MHz to 1980 MHz. Output terminals 617, 618 and 619 provide the respective signals in the different frequency ranges. The multi-mode transceiver 6 further comprises a control input 600 which is connected to the power detectors 230 and 130, respectively. By using the signal at the control input 600, the arrangements 60 and 61 can select the proper signal power to achieve the desired total output power.

At output terminal 603, the signals for the 2.5 generation standards in the low band frequency range are provided. The terminal 603 is coupled via a diode 601 to the input 11 of the first amplifier arrangement 1. In accordance, the terminal 617, providing 3G signals in the low frequency band, is coupled to the signal input 11 of the first amplifier arrangement 1 via a second diode 614. The terminals 604, 618, and 619 for signals in the high and middle frequency band are coupled to the signal input 21 of the second amplifier arrangement 2 via respective diodes 602, 612 and 613, respectively.

The diodes 601, 602 and 612 to 614 are switching elements, which in operation connect or disconnect the corresponding output terminal of the multi-mode transceiver 6 to the respective signal input of the amplifier arrangements 1 or 2. While in this embodiment, the switching elements are implemented using PIN-diodes and proper biasing, switching transistors or other components can also be used.

Figure 4:
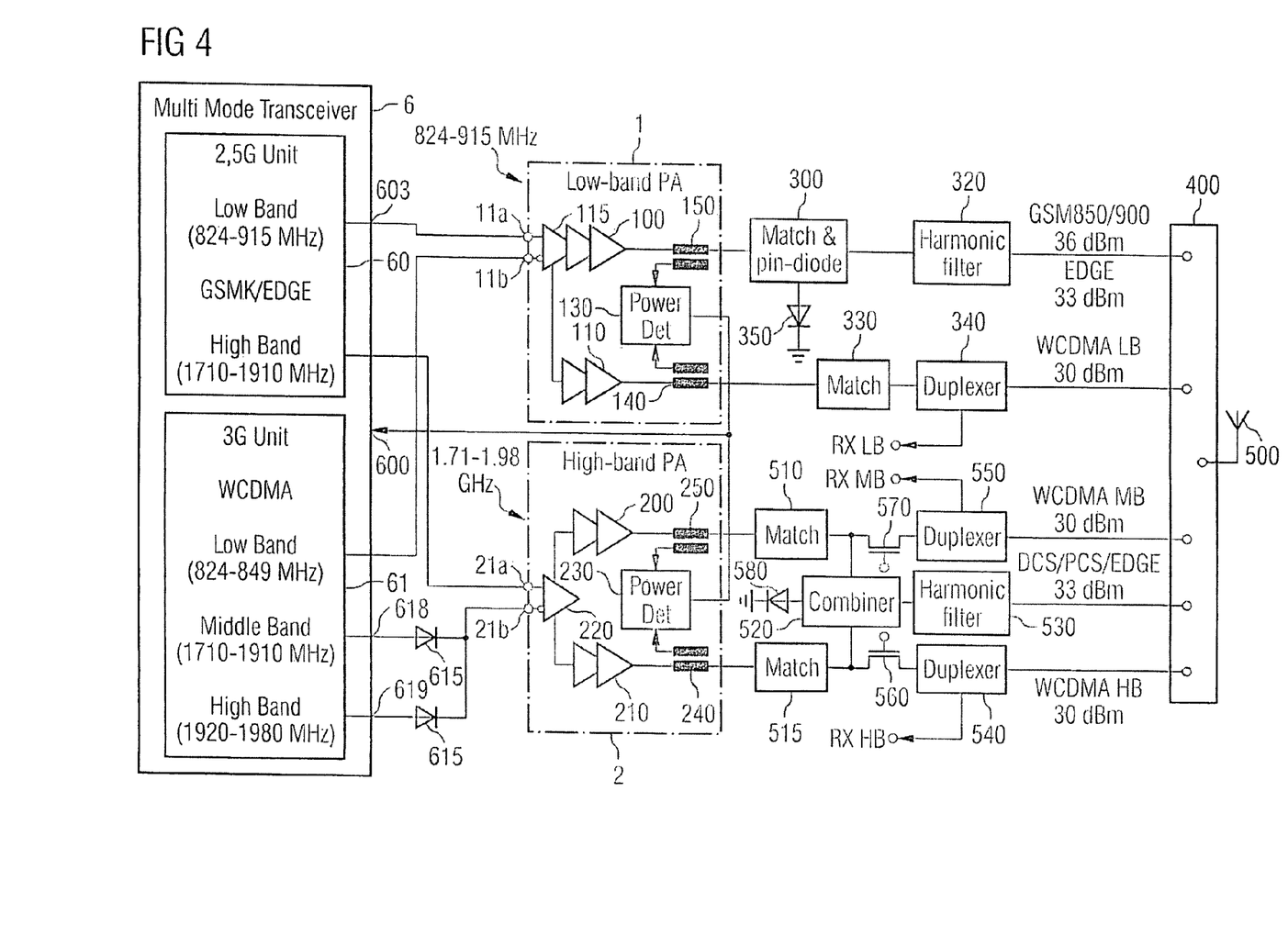
FIG. 4 shows a third exemplary embodiment of a transmitter arrangement.

A further embodiment is shown in FIG. 4. In this embodiment, the common stage of each amplifier arrangements 1, 2 is adapted for differential or balanced signal processing. However, the two input terminals 11a and 11b are coupled to single ended terminals and single ended signals are fed into the common stages 115 and 220, respectively. In particular, the input terminal 11b the first amplifier arrangement, connected to the common stage 115 is connected to the output terminal 617 of transceiver 6 providing a signal with non-constant envelope in the low frequency band. The input terminal 11a of the first amplifier arrangement 1 is directly connected to the output terminal 603 of the multi-mode transceiver 6. At the output terminal 603, a signal within the low frequency band comprising a data content according to the 2.5 Generation communication standard is provided.

The terminals 618 and 619 for providing signals within the "Middle Band" and "High Band" frequency ranges of the second arrangement 61 are coupled to the input terminals 21b of the second amplifier arrangement 2 via the switching elements 615, those elements 615 implemented by PIN-diodes. The second input terminal 22a coupled to a first amplifier stage 220 of the second amplifier arrangement 2 is connected directly to the output terminal 604. The arrangement of FIG. 4 decreases the number of switching elements from five, as shown in FIG. 3, to only two used for coupling the "Middle Band" and the "High Band" output terminals to the second amplifier arrangement 2. Each differential input of the power amplifiers of the shared stages 115 and 220 is used as a separate signal input coupled to the multi-mode transceiver 6.

In this embodiment, the switching elements 560 and 570 at the output of the matching networks 510 and 515 of the first and the second amplification paths of amplifier arrangement 2 are disposed with switching transistors.

The gate terminals of the switching transistors are coupled to a control circuit for selectively switching on or off the signal paths in which the signal has to be transmitted. For example, if a signal according to the WCDMA/UMTS communication standard within the Middle Band is to be transmitted, the switching element 615 is switched by proper biasing the diode. The signal at the input 22b is amplified in the common amplifier stage 220 and in the further stages of the amplification path 200. At the same time the amplification path 210 for the "High Band" may be switched off to reduce power consumption. The amplified signal is then applied to the duplexer 550 and via the multiplexer unit 400 to the antenna 500.

If no signal within the "Middle Band" is transmitted or a signal in this frequency range is received via the antenna 500, the transistor 570 can be switched off, thereby separating the duplexer 550 from the matching network 510 and the second amplifier arrangement 2. The duplexer 550 applies any received signal to the corresponding RX MB terminal for further processing. Accordingly, a signal received in the "High Band" frequency range is applied by the duplexer 540 to the RX HB terminal for processing.

Figure 5:
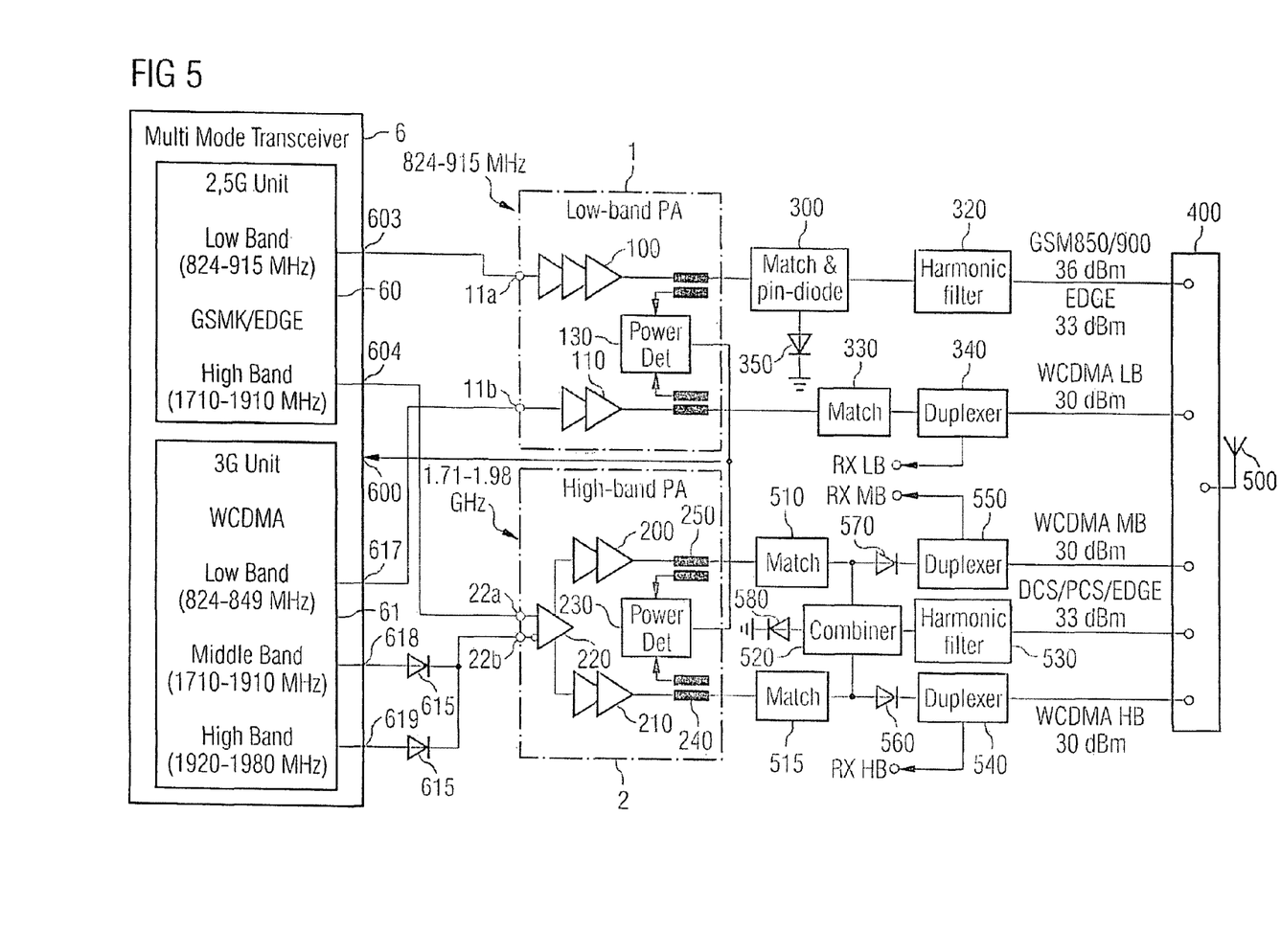
FIG. 5 shows a fourth exemplary embodiment of a transmitter arrangement.

FIG. 5 shows a further embodiment of the transmitter arrangement. In this embodiment, the first amplifier arrangement 1 comprises two separated amplification paths 100 and 110. The amplification path 100 comprises three amplifier stages while the amplification path 110 comprises only two amplifier stages. Accordingly, the input terminal 11b connected to the amplification path 110 is coupled to the output terminal 517 of the multi-mode transceiver 6. The amplifier stages of amplification path 110 are used to amplify signals according to third generation communication standards within the low frequency band. The amplification path 100 comprises a single signal input 11a which is directly connected to the output terminal 603 of multi-mode transceiver 6. The amplifier stages in the amplification path 100 amplify signals according to the 2.5 generation communication standards. This might be, for example, a GSM or an EDGE signal at the "Low Band".

With the different embodiments disclosed herein, the total number of amplifiers or amplification paths can be reduced. Further, easy activation or deactivation can be achieved by using diodes in the transmission paths. The different features of the embodiments shown herein can be combined by one skilled in the art to achieve one or more advantages of the present invention. Although specific embodiments have been illustrated and described, it will be appreciated by one of ordinary skill in the art that any arrangement which is calculated to achieve the same purpose may be substituted for the specific embodiment shown. It is to be understood that the above description is intended to be illustrative and not restrictive. The application is intended to cover any variations of the invention. The scope of the invention includes any other embodiments and applications in which the above structures and methods may be used. The scope of the invention should therefore be determined with reference to the appended claims along with the scope of equivalence to which such claims are entitled.

It is emphasized that the abstract is provided to comply with 37 CFR. Section 1.72(b) requiring an abstract that will allow the reader to quickly ascertain the nature and gist of a technical disclosure. It is submitted with the understanding that it will not be used to interpret or limit the scope of meaning of the claims.

The invention claimed is:

1. Transmitter device, comprising:
a first transmitter path for a transmission signal having a center frequency within a first frequency range, the first transmitter path comprising an amplifier arrangement, and the amplifier arrangement comprising a first amplification path with a first amplification gain and a second amplification path with a second amplification gain, respectively;
a second transmitter path for a transmission signal having a center frequency within a second frequency range, the second transmitter path comprising an amplifier arrangement, and the amplifier arrangement having a first and a second amplification path, wherein the first and second amplification paths comprising at least one common amplifier stage that is shared therebetween.

2. The transmitter device of claim 1, wherein the first amplification path and the second amplification path of the first transmitter path share a common amplifier stage that is shared therebetween.

3. The transmitter device of claim 1, wherein the amplifier arrangement of the first transmitter path further comprises a power detector, wherein the power detector is adapted to determine an output power of the first and second amplification path, respectively, of the first transmitter path.

4. The transmitter device of claim 3, wherein the power detector comprises a coupling device arranged in the first and in the second amplification path, wherein the coupling device is adapted to couple a portion of the signal's power out of the respective amplification path.

5. The transmitter device of claim 1, wherein the first and second amplification paths of the second transmitter path comprise the same amplification gain.

6. The transmitter device of claim 1, wherein the amplifier arrangement of the second transmitter path comprises a power detector, wherein the power detector is adapted to determine an output power of the first and second amplification path, respectively, of the second transmitter path.

7. The transmitter device of claim 6, wherein the power detector comprises a coupling device arranged in the first and second amplification path of the second transmitter path, wherein the coupling device is adapted to couple a portion of the signal's power out of the respective amplification path.

8. The transmitter device of claim 1, further comprising:
a signal output of the first amplification path of the second transmitter path and a signal output of the second amplification path of the second transmitter path; and
an adjustable power combiner with a signal output, wherein the power combiner is coupled to the outputs of the first and second amplification paths of the second transmitter path.

9. The transmitter device of claim 8, further comprising a first and second matching network, wherein the first and second matching networks are connected between the respective signal outputs of the first and second amplification paths and the power combiner.

10. The transmitter device of claim 8, wherein the signal output of the power combiner is coupled to a harmonic filter device.

11. The transmitter device of claim 1, further comprising:
a first and second duplexer unit;
a first switch arranged between a signal output of the first amplification path of the second transmitter path and the first duplexer unit; and
a second switch arranged between a signal output of the second amplification path of the second transmitter path and the second duplexer unit.

12. The transmitter device of claim 11, wherein the first and second switches each comprise a diode element configured to be adjusted by a DC-BIAS-signal, or comprise a field effect transistor.

13. Transmitter arrangement, comprising:
a first amplifier arrangement comprising a first amplification path and a second amplification path, wherein the first amplification path is adapted to amplify signals comprising a data content according to a first communication standard, and wherein the second amplification path is adapted to amplify signals comprising a data content according to a second communication standard; and
a second amplifier arrangement comprising a first and second amplification path sharing at least one common amplifier stage therebetween, and wherein the second amplifier arrangement is adapted to amplify signals comprising a data content according to at least the second communication standard.

14. The transmitter arrangement of claim 13, wherein the first amplification path and the second amplification path of the first amplifier arrangement share a common amplifier stage therebetween.

15. The transmitter arrangement of claim 13, wherein the first amplifier arrangement is adapted to amplify signals having a center frequency within a first frequency range and wherein the second amplifier arrangement is adapted to amplify signals having a center frequency within a second frequency range.

16. The transmitter arrangement of claim 13, wherein the first and second amplifier arrangement each comprise a power detector that is adapted to determine an output power of the respective first and second amplification paths.

17. The transmitter arrangement of claim 16, wherein the power detector comprises a power divider arranged in the respective first and second amplification path, wherein the power divider is adapted to couple a portion of the signal's power out of the respective amplification path.

18. The transmitter arrangement of claim 13, wherein the first and second amplification paths of the second amplifier arrangement comprise the same amplification gain.

19. The transmitter arrangement of claim 13, further comprising:
   a signal output of the first and of the second amplification path of the second amplifier arrangement; and
   an adjustable power combiner with a signal output that is coupled to the outputs of the first and second amplification paths.

20. The transmitter arrangement of claim 19, comprising a first and second matching network, wherein the first and second matching networks are connected between the respective signal outputs of the first and second amplification paths and the power combiner.

21. The transmitter arrangement of claim 19, wherein the signal output of the power combiner is coupled to a harmonic filter device.

22. The transmitter arrangement of claim 13, further comprising:
   a first and second duplexer unit;
   a first switch arranged between a signal output of the first amplification path of the second amplifier arrangement and the first duplexer unit; and
   a second switch arranged between a signal output of the second amplification path of the second amplifier arrangement and the second duplexer unit.

23. The transmitter arrangement of claim 22, wherein the first and second switches each comprise a diode element configured to be adjusted by a DC-BIAS-signal.

24. The transmitter arrangement of claim 13, wherein the at least one common amplifier stage comprises a balanced amplifier having a first input terminal and a second input terminal, wherein the first input terminal is adapted to receive signals comprising a data content according to the first communication standard, and the second input terminal is adapted to receive signals comprising a data content according to the second communication standard.

25. The transmitter device of claim 13, wherein common amplifier stage of the first amplifier arrangement comprises a balanced amplifier having a first input terminal and a second input terminal, wherein the first input terminal is adapted to receive signals comprising a data content according to the first communication standard, and the second input terminal is adapted to receive signals comprising a data content according to the second communication standard.

* * * * *